United States Patent
Lee et al.

(10) Patent No.: US 9,779,537 B2
(45) Date of Patent: Oct. 3, 2017

(54) METHOD AND APPARATUS FOR RAY TRACING

(71) Applicant: SAMSUNG ELECTRONICS CO., LTD., Suwon (KR)

(72) Inventors: Won Jong Lee, Seoul (KR); Young Sam Shin, Hwaseong (KR); Jae Don Lee, Yongin (KR); Seok Yoon Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 13/949,818

(22) Filed: Jul. 24, 2013

(65) Prior Publication Data

US 2014/0028666 A1    Jan. 30, 2014

(30) Foreign Application Priority Data

Jul. 24, 2012 (KR) ........................ 10-2012-0080547

(51) Int. Cl.
*G06T 15/06* (2011.01)

(52) U.S. Cl.
CPC .................................. *G06T 15/06* (2013.01)

(58) Field of Classification Search
None
See application file for complete search history.

(56) References Cited

U.S. PATENT DOCUMENTS

| 6,466,227 B1 | 10/2002 | Pfister et al. |
| 6,556,200 B1 | 4/2003 | Pfister et al. |
| 7,999,808 B1 | 8/2011 | Aila et al. |
| 2009/0049452 A1* | 2/2009 | Kriegel et al. ............... 719/313 |
| 2009/0244058 A1 | 10/2009 | Purcell et al. |
| 2009/0262132 A1* | 10/2009 | Peterson ............... G06T 15/005 345/619 |
| 2010/0079451 A1 | 4/2010 | Zhou et al. |
| 2010/0188396 A1 | 7/2010 | Mejdrich et al. |
| 2011/0170557 A1* | 7/2011 | Aila et al. ..................... 370/408 |
| 2011/0234583 A1 | 9/2011 | Bakalash |
| 2011/0285710 A1 | 11/2011 | Mejdrich et al. |
| 2012/0069023 A1* | 3/2012 | Hur ........................ G06T 15/06 345/426 |

(Continued)

FOREIGN PATENT DOCUMENTS

| CN | 101826215 A | 9/2010 |
| CN | 102053258 A | 5/2011 |

(Continued)

OTHER PUBLICATIONS

Communication dated Mar. 20, 2017 issued by the State Intellectual Property Office of P.R. China in counterpart Chinese Patent Application No. 201310312590.7.

(Continued)

*Primary Examiner* — Kumar Patel
*Assistant Examiner* — Richard M Russell
(74) *Attorney, Agent, or Firm* — Sughrue Mion, PLLC

(57) ABSTRACT

Provided is a method and apparatus for ray tracing. A traversal unit to process an input ray to be input among a plurality of traversal units may be determined based on age of each of the plurality of traversal units. Age of the determined traversal unit may be determined based on age of each of rays that are processed by the traversal unit.

14 Claims, 8 Drawing Sheets

(56) References Cited

U.S. PATENT DOCUMENTS

2012/0081368 A1* 4/2012 Park ............... G06T 15/005
                                                                   345/426

FOREIGN PATENT DOCUMENTS

| | | |
|---|---|---|
| CN | 102243768 A | 11/2011 |
| CN | 102495427 A | 6/2012 |
| JP | 11-353496 | 12/1999 |
| JP | 2001-34783 | 2/2001 |
| JP | 2005-327146 | 11/2005 |
| KR | 10-2008-0052328 A | 6/2008 |
| KR | 10-2009-0064155 | 6/2009 |
| KR | 10-2009-0065353 | 6/2009 |
| KR | 10-2010-0094532 | 8/2010 |
| KR | 10-2011-0059037 | 6/2011 |
| WO | WO 2009/067351 | 5/2008 |

OTHER PUBLICATIONS

Communication dated Jul. 4, 2017 issued by the Japanese Patent Office in counterpart Japanese Patent Application No. 2013-152912
* None.

* cited by examiner

METHOD AND APPARATUS FOR RAY TRACING

CROSS-REFERENCE TO RELATED APPLICATIONS

This application claims the priority benefit of Korean Patent Application No. 10-2012-0080547, filed on Jul. 24, 2012, in the Korean Intellectual Property Office, the disclosure of which is incorporated herein by reference.

BACKGROUND

1. Field

One or more embodiments of the following description relate to a method and apparatus for ray tracing, and more particularly, to a method and apparatus for performing traversal and an intersection test of a ray.

2. Description of the Related Art

Three-dimensional (3D) rendering is an image process for synthesizing data of a 3D object into an image that is observed at a given viewpoint of a camera.

As one example of a rendering method, a rasterization method that generates an image while projecting a 3D object onto a screen may be employed. As another example of a rendering method, a ray tracing method that generates an image by tracing a path of light incident along a ray that is emitted from a viewpoint of a camera towards each of pixels of an image.

Among the preceding rendering methods, the ray tracing method typically generates a high quality image by taking into account physical properties of light such as reflection, refraction, transmission, and the like. However, a significantly large amount of calculation may be necessary for ray tracing and thus, the ray tracing method may not perform rendering at a high speed.

Each of traversal of an acceleration structure and an intersection test between ray primitives may be one of the most important factors used to determine the ray tracing performance. The traversal of the acceleration structure and the intersection test between the ray primitives may be performed up to a few times to tens of times with respect to each of rays.

The acceleration structure may be a spatial division acceleration structure. The acceleration structure may be a data structure expressed by spatially dividing a scene object to be rendered. A data structure, for example, a grid, a kd-tree, a bounding volume hierarchy (BVH), and the like, may be employed as the acceleration structure.

The above traversal and intersection test may be a process of utilizing at least 70% of calculation amount and occupying at least 90% of a memory bandwidth in ray tracing. Dedicated hardware may be employed for real-time processing of the traversal and the intersection test.

SUMMARY

The foregoing and/or other aspects are achieved by providing a ray processing method, including: selecting, from among a plurality of traversal units based on age of each of the plurality of traversal units, a traversal unit to process traversal of an input ray; and processing the traversal of the input unit using the selected traversal unit. The age of each of the plurality of traversal units may be determined based on a state of each of one or more rays that are processed by each of the plurality of traversal units.

The traversal unit may be selected from among the plurality of traversal units based on a state of each of the plurality of traversal units.

The age of each of the plurality of traversal units may be determined based on age of each of the one or more rays that are processed by each of the plurality of traversal units.

The age of each of the one or more rays may be determined based on the number of times that traversal of each of the one or more rays is repeatedly processed by the plurality of traversal units.

The age of each of the plurality of traversal units may be a sum of age of the one or more rays that are processed by each of the plurality of traversal units.

The age of each of the plurality of traversal units may be the average age of the one or more rays that are processed by each of the plurality of traversal units.

The selected traversal unit may be a traversal unit having the longest age among traversal units having the smallest number of rays within an input buffer among the plurality of traversal units.

The processing may be repeatedly performed. When the processing is repeated, age of the input ray may increase by "1".

The ray processing method may further include: selecting, from among a plurality of intersection test units, an intersection test unit to process an intersection test of an input ray; and processing the intersection test of the input unit using the selected intersection test unit.

The foregoing and/or other aspects are achieved by providing a ray tracing apparatus, including: a plurality of traversal units to process traversal of a ray; and a ray dispatch unit to select, from among the plurality of traversal units based on age of each of the plurality of traversal units, a traversal unit to process traversal of an input ray. The selected traversal unit may process the traversal of the input ray, and the age of each of the plurality of traversal units may be determined based on a state of each of one or more rays that are processed by each of the plurality of traversal units.

The ray dispatch unit may select the traversal unit from among the plurality of traversal units based on a state of each of the plurality of traversal units.

The ray dispatch unit may select, from among the plurality of traversal units as the traversal unit to process traversal of the input ray, a traversal unit having the longest age among traversal units having the smallest number of rays within an input buffer.

The plurality of traversal units may repeatedly process the traversal of the input ray. When the traversal of the input ray is repeated, age of the input ray may increase by "1".

The ray tracing apparatus may further include: a plurality of intersection test units to process an intersection test of a ray; and a ray arbitration unit to select, from among the plurality of intersection test units, an intersection test unit to process an intersection test of an input ray. The selected intersection test unit may process the intersection test of the input unit.

The foregoing and/or other aspects are achieved by providing a ray processing apparatus that includes a processor to control one or more processor-executable units, a ray tracing unit to assign a state to each traversal unit of a plurality of traversal units based on a state of each ray that has been input to each respective traversal unit, and a ray dispatch unit to select one traversal unit of the plurality of traversal units based on the state assigned to the traversal unit by the ray tracing unit and to input a ray to the selected traversal unit.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
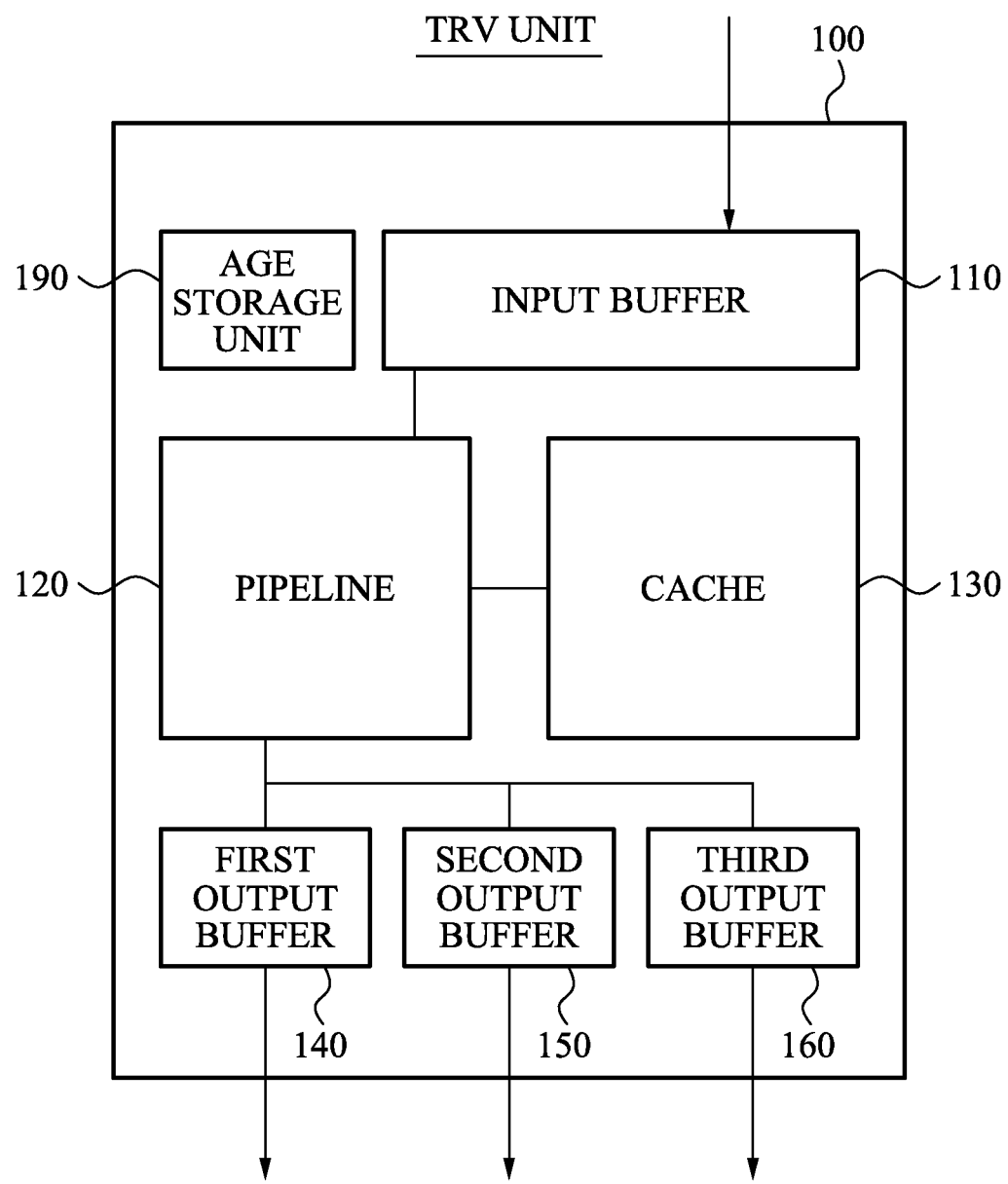
FIG. 1 illustrates a configuration of a traversal (TRV) unit according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

Hereinafter, the term "ray" may indicate a "ray object" that is a target of ray tracing, a "data structure" that indicates a ray, "information of a ray", or "data associated with a ray". Accordingly, the terms "ray", "ray object", "ray structure", "information of a ray", and "data associated with a ray" may be used interchangeably.

FIG. 1 illustrates a configuration of a traversal (TRV) unit 100 according to an embodiment.

The TRV unit 100 is a unit for ray traversal and may process traversal of a ray. The TRV unit 100 may traverse an acceleration structure of a ray.

The TRV unit 100 may include, for example, an input buffer 110, a pipeline 120, a cache 130, a first output buffer 140, a second output buffer 150, and a third output buffer 160.

The input buffer 110 may store one or more rays to be processed in the pipeline 120. For example, a ray input to the TRV unit 100 may wait for traversal processing within the input buffer 110. When the input buffer 110 can store no additional rays, the input buffer 110 may be indicated as unavailable. When the input buffer 110 can still store an additional ray, the input buffer 110 may be indicated as still available.

The pipeline 120 may process traversal of a ray. The pipeline 120 may simultaneously process traversal of maximum $n_1$ rays. When the pipeline 120 is processing $k_1$ rays, the pipeline utilization of the TRV unit 100 may be $k_1/n_1$. Here, $n_1$ may denote an integer greater than or equal "1" and $k_1$ may denote an integer between "1" and $n_1$.

The cache 130 may cache data associated with traversal of a ray. The cache 130 may provide data associated with the traversal of the ray to the pipeline 120.

Each of the first output buffer 140, the second output buffer 150, and the third output buffer 160 may store the one or more rays processed by the pipeline 120. The ray for which the traversal has been processed by the pipeline 120 may be provided to one of the entities based on a state of the ray. A ray to be output from the TRV unit 100 may wait to be output in one of the first output buffer 140, the second output buffer 150, and the third output buffer 160.

For example, the first output buffer 140 may store a ray to be repeatedly processed by the TRV unit 100. The second output buffer 150 may store a ray for which an intersection test is to be processed, and the third output buffer 160 may store a ray for which ray tracing has been completed and for which shading is to be processed.

The TRV unit 100 may optionally include an age storage unit 190. The age storage unit 190 may store an age of the TRV unit 100. The age of the TRV unit 100 will be further described with reference to FIG. 5. The age storage unit 190 may be an entity that stores data such as a register, a cache, a buffer, and the like, or alternatively may be a tag that indicates an age.

Figure 2:
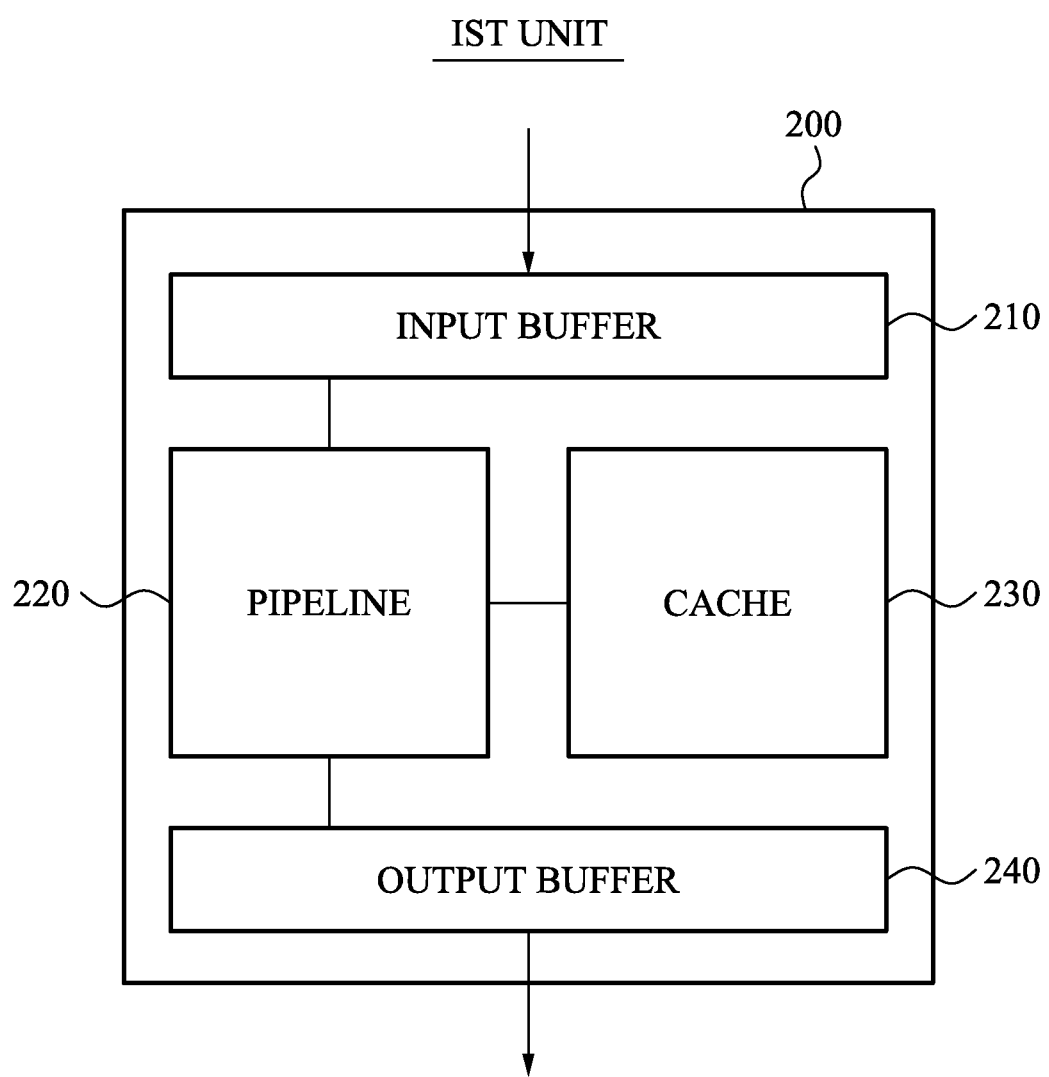
FIG. 2 illustrates a configuration of an intersection test (IST) unit according to an embodiment.

FIG. 2 illustrates a configuration of an intersection test (IST) unit 200 according to an embodiment.

The IST unit 200 is a unit for an intersection test of a ray, and may process an intersection test of a ray.

The IST unit 200 may include, for example, an input buffer 210, a pipeline 220, a cache 230, and an output buffer 240.

The input buffer 210 may store one or more rays to be processed in the pipeline 220. For example, a ray input to the IST unit 200 may wait for processing of an intersection test within the input buffer 210. When the input buffer 210 can store no additional rays, the input buffer 210 may be indicated as unavailable. When the input buffer can still store an additional ray, the input buffer may be indicated as still available.

The pipeline 220 may process an intersection test of a ray. The pipeline 220 may simultaneously process intersection tests of a maximum of $n_2$ rays. When the pipeline 220 is processing $k_2$ rays, the pipeline utilization of the IST unit 200 may be $k_2/n_2$. Here, $n_2$ may denote an integer greater than or equal to "1" and $k_2$ may denote an integer between "1" and $n_2$.

The cache 230 may cache data associated with an intersection test of a ray. The cache 230 may provide data associated with the intersection test of the ray to the pipeline 220.

The output buffer 240 may store information about each of one or more rays processed by the pipeline 220. A ray for which the intersection test has been processed by the pipeline 220 may be repeatedly input to the TRV unit 100 of FIG. 1. A ray to be input to the TRV unit 100 may be temporarily stored in the output buffer 240 before being output by the IST unit 200.

Figure 3:
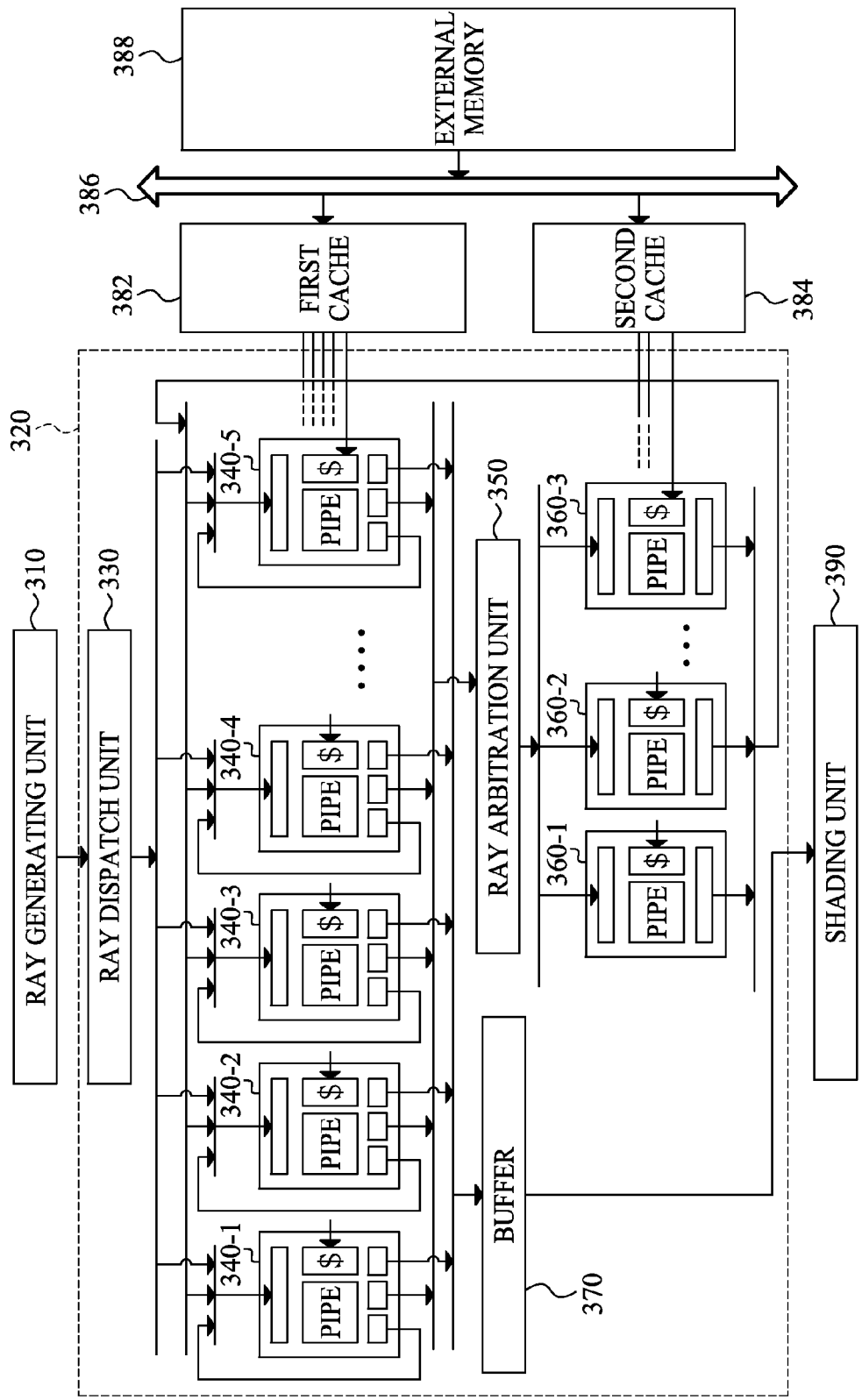
FIG. 3 illustrates a configuration of a ray tracing unit and entities associated with the ray tracing unit according to an embodiment.

FIG. 3 illustrates a configuration of a ray tracing unit and entities associated with the ray tracing unit according to an embodiment.

FIG. 3 shows a structure of a graphics processing unit (GPU) or rendering hardware based on ray tracing.

The configuration of FIG. 3 may include, for example, a ray generating unit 310, a ray tracing unit 320, a first cache 382, a second cache 384, a bus 386, an external memory 388, and a shading unit 390. The ray generating unit 310, the first cache 382, the second cache 384, and the shading unit 390 may be constituent components of the GPU. That is, in an embodiment, the GPU may include the ray generating unit 310, the first cache 382, the second cache 384, and the shading unit 390.

The ray generating unit 310 may generate a ray. The ray generating unit 310 may provide the generated ray to the ray tracing unit 320. The ray generating unit 310 may indicate an operation or an entity that provides information about the ray to the ray tracing unit 320.

The ray tracing unit 320 may process tracing of a ray. The ray tracing unit 320 may provide a ray for which tracing has been processed to the shading unit 390.

The shading unit 390 may process shading based on information of the ray for which tracing has been processed. The shading unit 390 may perform shading processing after tracing of the ray has been processed. Shading may refer to finally determining a color of a pixel of an image by adding up results of rays that are accumulated with respect to the pixel of the image. Here, the result of the ray may indicate a result of ray tracing of the ray.

The first cache 382 and the second cache 384 may cache data required to process tracing of a ray. The data required to process tracing of the ray may be stored in the external memory 388. The first cache 382 and the second cache 384 may cache a portion of data stored in the external memory 388. Data related to tracing of the ray may be transmitted between the first cache 382 and the external memory 388 or between the second cache 384 and the external memory 384 through the bus 386.

The first cache 382 may provide data required to process traversal of a ray to the cache 130 of the TRV unit 100 that is described above with reference to FIG. 1. The second cache 384 may provide data required to process an intersection test of a ray to the cache 230 of the IST unit 200 that is described above with reference to FIG. 2. Accordingly, each of the cache 130 of the TRV unit 100 and the cache 230 of the IST unit 200 may be a level 1 cache, and each of the first cache 382 and the second cache 384 may be a level 2 cache.

Hereinafter, constituent components of the ray tracing unit 320 will be described.

When a tree is utilized as a spatial division acceleration structure and a triangle is utilized as a primitive, the ray tracing unit 320 may search for a leaf node that a ray initially visits, through hierarchical traversal from a root node of an acceleration structure tree to a lower node. When the leaf node is visited through the above search, the ray tracing unit 320 may perform an intersection test between the ray and each of triangles present within the leaf node. When a triangle intersecting the ray is not found within the leaf node, the ray tracing unit 320 may search for a primitive intersecting the ray by continuing traversal of the tree. The above traversal and intersection test may be performed by the TRV unit 100 of FIG. 1 and the IST unit 200 of FIG. 2, respectively.

As described above, due to a ray tracing characteristic, ray tracing may simultaneously require a large quantity of computations and a wide memory bandwidth. That is, every time a node is visited or every time an intersection test is performed between a ray and a primitive, data of the node or data of the primitive, or both, needs to be fetched from the external memory 388 and then the above operations need to be performed. Accordingly, the TRV unit 100 employed for the traversal may include the cache 130, and the IST unit 200 employed for the intersection test may include the cache 230. When data of the node or data of the primitive is absent in the cache 130 or the cache 230, latency may occur in fetching data from the external memory 388. Ray tracing performance may thereby also be degraded.

The ray tracing unit 320 may include, for example, a ray dispatch unit 330, a plurality of TRV units, a ray arbitration unit 350, a plurality of IST units, and a buffer 370.

Each of the plurality of TRV units may be similar to the TRV unit 100 that is described above with reference to FIG. 1. Referring to FIG. 3, the plurality of TRV units may include a first TRV unit 340-1, a second TRV unit 340-2, a third TRV unit 340-3, a fourth TRV unit 340-4, and an N-th TRV unit 340-5. Here, N may denote any integer greater than or equal to "2".

The ray dispatch unit 330 may control transmission of a ray between the ray generating unit 310 and the plurality of TRV units. The ray dispatch unit 330 may distribute, to any one of the plurality of TRV units, an input ray that is input to the ray tracing unit 320.

When the input ray is distributed only based on whether input buffers of the plurality of TRV units are available, load imbalance may occur in the pipeline utilization of the plurality of TRV units. For example, when the ray dispatch unit 330 selects, from among the plurality of TRV units, a TRV unit to process traversal of the input ray by verifying only whether there is any empty space in each of the input buffers of the plurality of TRV units, processing of traversal of a ray may be concentrated on a predetermined TRV unit.

A ray that is input to one of the plurality of TRV units may be a ray that is generated by the ray generating unit 310, may be a ray for which a traversal is processed by one of the plurality of TRV units, or may be a ray for which an intersection test has been processed by one of the plurality of IST units, for example, the IST unit 200. A ray to be output by one of the plurality of TRV units may be input again to the above single TRV unit, may also be input to an IST unit that is selected by the ray arbitration unit 350 from among the plurality of IST units, and may also be input to the shading unit 390.

The buffer 370 may store one or more rays to be output to the shading unit 390. A ray to be output to the shading unit 390 may be temporarily stored in the buffer 370 before being output to the shading unit 390.

The ray arbitration unit 350 may arbitrate transmission of a ray between the plurality of TRV units and the plurality of IST units. That is, the ray arbitration unit 350 may control a data flow of a ray between the plurality of TRV units and the plurality of IST units.

Each of the plurality of IST units may be configured similarly to the IST unit 200 that is described above with reference to FIG. 2. Referring to FIG. 3, the plurality of IST units may include a first IST unit 360-1, a second IST unit 360-2, and an M-th IST unit 360-3. Here, M may denote an integer greater than or equal to "2".

A ray to be output by one of the plurality of IST units may be input to one of the plurality of TRV units. Here, the TRV unit to which the ray is input may be a TRV unit that has processed traversal of the ray.

Referring to FIG. 3, within each of the plurality of TRV units, the symbol "pipe" may denote the pipeline 120 and the symbol "$" may denote the cache 130. Within each of the plurality of IST units, the symbol "pipe" may denote the pipeline 220, and the symbol "$" may denote the cache 230.

The pipeline utilization of the plurality of TRV units and the plurality of IST units may be balanced by the ray dispatch unit 330 and the ray arbitration unit 350, respectively.

Figure 4:
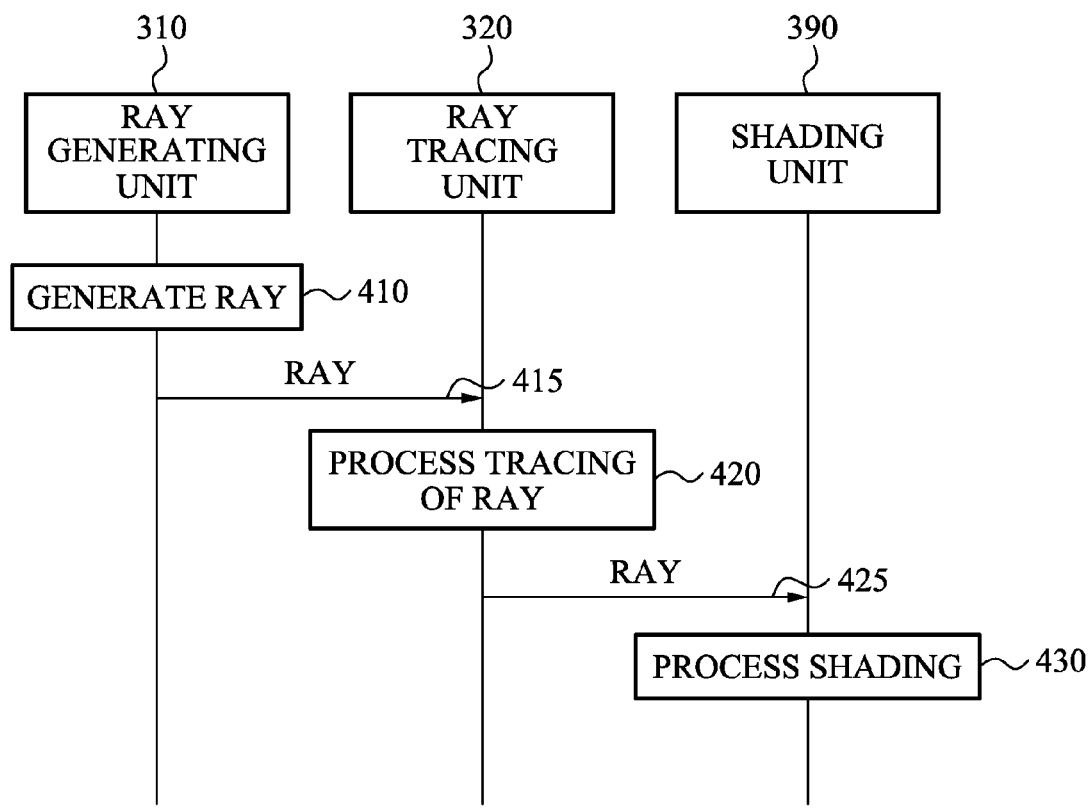
FIG. 4 illustrates an operation of constituent components of a graphics processing unit (GPU) according to an embodiment.

FIG. 4 illustrates an operation of constituent components of a GPU according to an embodiment.

In operation 410, the ray generating unit 310 may generate a ray.

In operation 415, the ray generating unit 310 may provide the generated ray to the ray tracing unit 320. The ray generating unit 310 may output the generated ray to the ray tracing unit 320.

In operation 420, the ray tracing unit 320 may process tracing of the ray.

In operation 425, the ray tracing unit 320 may provide, to the shading unit 390, the ray for which tracing has been processed. The ray tracing unit 320 may output, to the shading unit 390, the ray for which tracing has been processed.

In operation 430, the shading unit 390 may process shading based on the ray for which tracing has been processed.

As described above, ray inputs and ray outputs through a variety of paths may occur in the TRV unit 100. Accordingly, a destination to process an input ray may need to be determined based on a state of a pipeline of each of the plurality of TRV units as well as the number of rays within an input buffer of each of the plurality of TRV units. Here, a state of a pipeline may indicate a state of a ray that is being processed within the pipeline.

Figure 5:
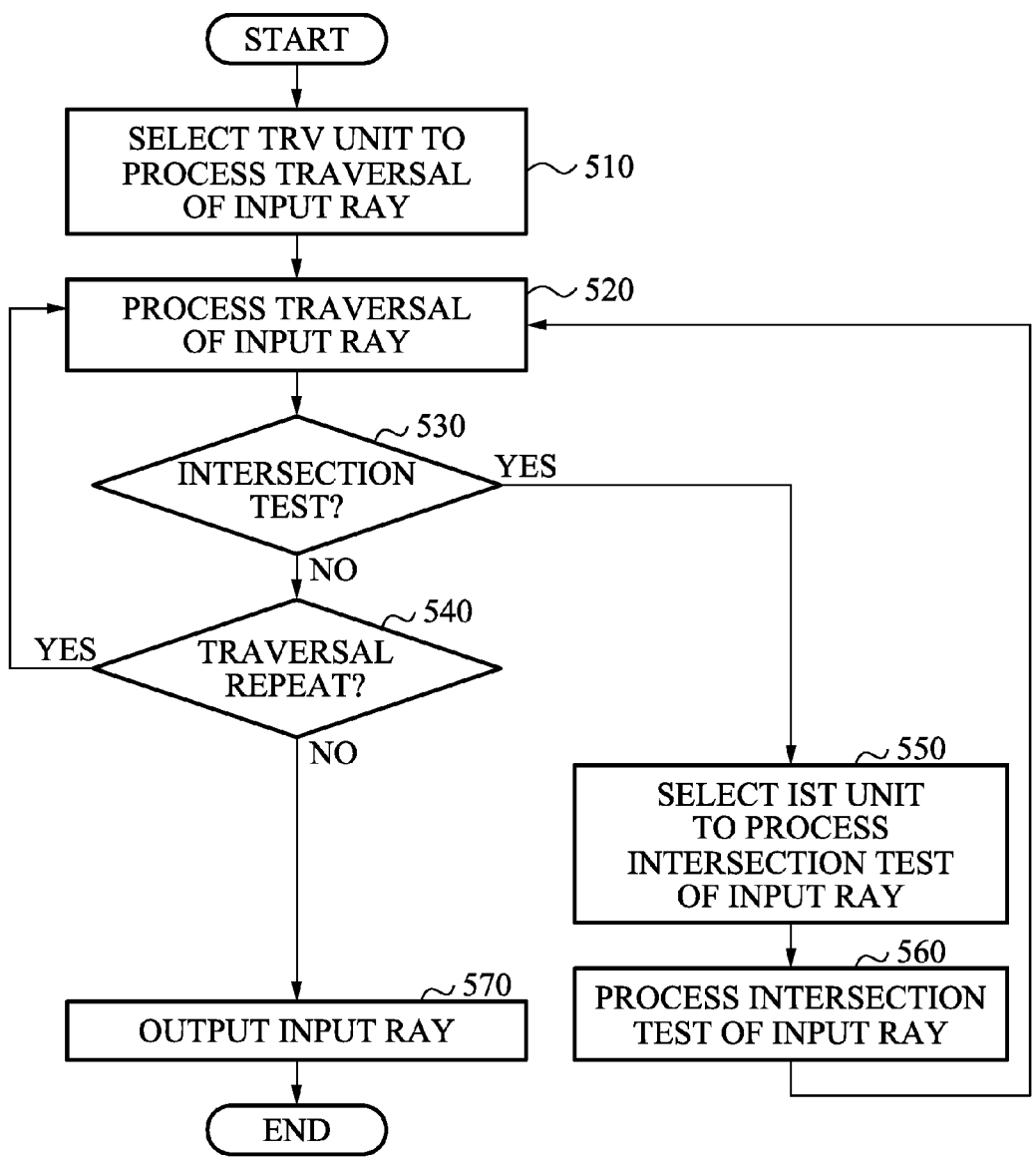
FIG. 5 illustrates a ray tracing method according to an embodiment.

FIG. 5 illustrates a ray tracing method according to an embodiment.

The following operations 510 through 570 may correspond to the aforementioned operation 420 of FIG. 4.

An input ray may be a ray that is provided by the ray generating unit 310 in operation 415.

In operation 510, the ray dispatch unit 330 may select a TRV unit from among a plurality of TRV units to process traversal of an input ray based on a state of each of the plurality of TRV units.

The ray dispatch unit 330 may select, from among the plurality of TRV units based on a state of each of the plurality of TRV units, the TRV unit to process traversal of the input ray. In this instance, a state of the TRV unit 100 may indicate whether the input buffer 110 of the TRV unit 100 is available or the number of rays within the input buffer 110 of the TRV unit 100.

For example, the ray dispatch unit 330 may select one TRV unit to process traversal of the input ray, from among the plurality of TRV units. More specifically, the ray dispatch unit 330 may select a TRV unit having the greatest age among TRV units having the smallest number of rays within an input buffer. Alternatively, the ray dispatch unit 330 may select, from among the plurality of TRV units, a TRV unit having the greatest age among TRV units for which an input buffer is available.

The age of each of the plurality of TRV units may be determined based on a state of each of one or more rays that are processed by each of the plurality of TRV units.

The age of each of the plurality of TRV units may be calculated or managed by each TRV unit, the ray dispatch unit 330, or the ray tracing unit 320. For example, the TRV unit 100 may calculate the age of the TRV unit 100, may store the calculated age in the age storage unit 190, and may provide the stored age to the ray dispatch unit 330. Alternatively, the ray dispatch unit 330 may calculate and store an age of each of the plurality of TRV units.

The age of each of the plurality of TRV units may be determined based on a state of each of one or more rays that are processed by each of the plurality of TRV units. Each of one or more rays that are processed by the TRV unit 100 may include a ray that is processed in the pipeline 120 of the TRV unit 100 and/or a ray that is stored in the input buffer 130 of the TRV unit 100.

A state of a ray may be an age of the ray. That is, each of one or more rays that are processed by the TRV unit 100 may have an age.

Age of a ray may be information indicating a duration of time in which the ray has been input to the TRV unit 100 or the ray dispatch unit 330 and remains in the TRV unit 100 or the ray dispatch unit 330.

The age of each of the plurality of TRV units may be determined based on an age of each of one or more rays that are processed by each of the plurality of TRV units. That is, an age of the TRV unit 100 may be information representing a state or cumulative age of each of one or more rays that are input to the TRV unit 100. For example, an age of each of the plurality of TRV units may be a sum of the ages of one or more rays that are processed by each of the plurality of TRV units, respectively. That is, the age of the TRV unit 100 may be a sum of the ages of one or more rays that are processed by the TRV unit 100. As another example, the age of each of the plurality of TRV units may be the average age of one or more rays that are processed by each of the plurality of TRV units, respectively. That is, the age of the TRV unit 100 may be the average age of one or more rays that are processed by the TRV unit 100. As still another example, the ray dispatch unit 330 may input a ray to be processed to a particular TRV unit of the plurality of TRV units by directly considering an age of the ray to be processed instead of or in addition to the ray dispatch unit 300's consideration of the relative age of the particular TRV unit with respect to the plurality of TRV units.

The age of each of one or more rays may be determined based on the number of times that traversal of each of the one or more rays has been repeatedly processed by the plurality of TRV units. In the case of repeating the traversal, one traversal may correspond to visiting a single node of an acceleration structure tree.

The age of a ray may be the number of times that traversal of the ray has been repeatedly processed by the plurality of TRV units. For example, when a new ray having the age of "1" is input to the input buffer 110 of the TRV unit 100, the age of the TRV unit 100 may be increased by "1". Alternately, when operation 520 of processing traversal of an input ray is repeated, the age of the input ray may increase by "1". In operation 570 of outputting the ray for which tracing has been completed, the age of the TRV unit 100 may be decreased by the age of the ray to be output.

That is, a great age or a high age of the TRV unit 100 may indicate that a relatively large number of rays are likely to retire relatively soon within the pipeline 120 of the TRV unit 100. Accordingly, rays within the pipeline 120 of the TRV unit 100 having a great age may be relatively quickly consumed. When distributing an input ray to the plurality of TRV units, a balance between the plurality of TRV units may be maintained by preferentially distributing the input ray to a TRV unit having the greatest age among the plurality of TRV units.

In operation 520, traversal of the input ray may be processed using the selected TRV unit. That is, the selected TRV unit may be used to process traversal of the input ray.

In operation 530, the selected TRV unit or the ray dispatch unit 330 may determine whether to perform an intersection test. When the intersection test is required, operation 550 may be performed. On the contrary, when the intersection test is not required, operation 540 may be performed.

In operation 540, the selected TRV unit or the ray dispatch unit 330 may determine whether to repeat traversal. When traversal is determined to be repeated, operation 520 may be repeatedly performed to continue the traversal of a tree. On the contrary, when the traversal is determined to not be repeated, operation 570 may be performed.

The plurality of TRV units may be used to repeatedly process traversal of the input ray. When traversal of the input ray is repeated, the age of the input ray may be increased by "1". Whether to repeat the above traversal may be determined based on the result of the intersection test.

Operations 530 and 540 are exemplary and thus, a predetermined order or method may be employed to determine whether to perform the intersection test and to determine whether to repeat the traversal.

In operation 550, the ray arbitration unit 350 may select, from among a plurality of IST units, an IST unit to process the intersection test of the input ray.

One or more of the plurality of TRV units may simultaneously or substantially simultaneously output rays to the ray arbitration unit 350.

The ray arbitration unit 350 may select a ray to be preferentially processed based on a state of each of the simultaneously output rays. For example, the ray arbitration unit 350 may select, from among the simultaneously output rays as the ray to be preferentially processed, a ray having the greatest age.

Alternatively, the ray arbitration unit 350 may select, from among the simultaneously output rays, the ray to be preferentially processed based on a state of each of the plurality of TRV units that has simultaneously output the rays. For example, the ray arbitration unit 350 may select, as the ray to be preferentially processed, a ray that is output from a TRV unit having the greatest age from among the plurality of TRV units that has simultaneously output the rays. In an embodiment, if or when a plurality of rays are available for output from a single particular TRV unit, then the ray arbitration unit 350 may select the ray having the greatest age from among the plurality of rays of the particular TRV unit as an input to an IST unit.

In operation 560, the selected IST unit may process an intersection test of the input ray. When the intersection test has been processed, the traversal of the ray may be repeated. Accordingly, operation 520 may be repeatedly performed after operation 560 is performed.

In operation 570, the selected TRV unit may output, to the shading unit 390, the input ray of which tracing is processed. The input ray of which tracing is processed may be output to the shading unit 390 through the buffer 370.

Figure 6:
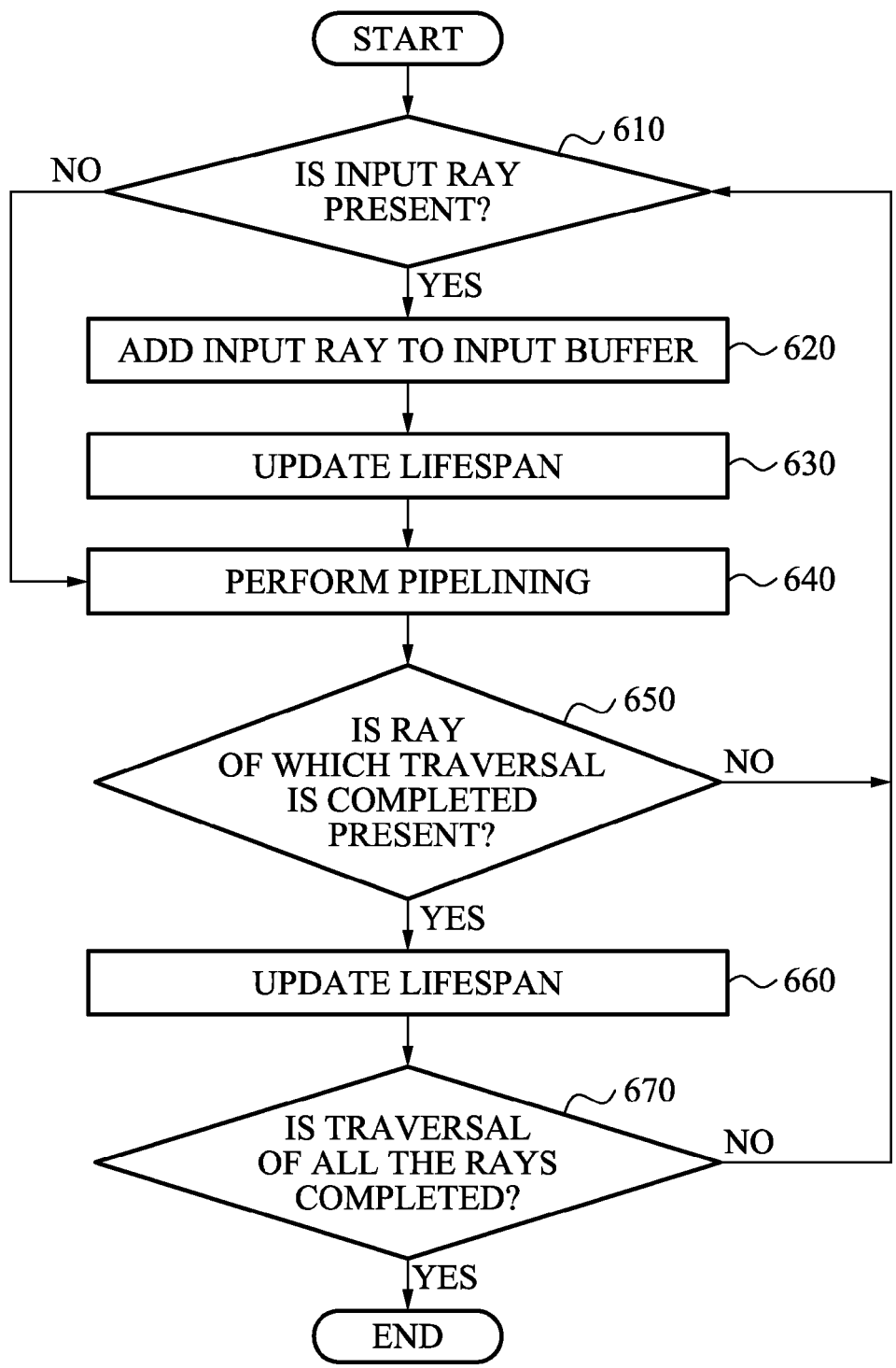
FIG. 6 illustrates a method of managing age of a TRV unit according to an embodiment.

FIG. 6 illustrates a method of managing an age of the TRV unit 100 according to an embodiment.

In operation 610, the TRV unit 100 may determine whether an input ray is present. When the input ray is present, operation 620 may be performed. On the contrary, when the input ray is absent, operation 640 may be performed.

In operation 620, the TRV unit 100 may add the input ray to the input buffer 110.

In operation 630, the TRV unit 100 may update an age of the TRV unit 100. For example, the TRV unit 100 may set an age of the input ray to "1". The TRV unit 100 may add "1" to the age of the TRV unit 100, or may add the age of the input ray to the age of the TRV unit 100, or may update the age of the TRV unit 100 based on the age of the input ray such as by using an average age of all input rays.

The TRV unit 100 may store the updated age of the TRV unit 100 in the age storage unit 190.

In operation 640, the pipeline 120 may process traversal of rays within the pipeline 120. When an empty space is present within the pipeline 120, a ray within the input buffer 110 may be transmitted to the pipeline 120 in operation 640. Rays within the input buffer 110 may be transmitted to the pipeline 120 according to a first-in first-output (FIFO) scheme.

In operation 650, the TRV unit 100 may determine whether a ray for which traversal has been completed is present. When the ray for which traversal has been completed is present, operation 660 may be performed. On the contrary, when the ray for which traversal has been completed is absent, operation 610 may be repeatedly performed.

An age of a ray for which traversal has not been completed may be increased by "1".

In operation 660, the TRV unit 100 may update the age of the TRV unit 100.

The TRV unit 100 may apply the age of the ray for which traversal has been completed to an updating of the age of the TRV unit 100. The TRV unit 100 may decrease the age of the TRV unit 100 by the age of the ray for which traversal has been completed.

In operation 670, the TRV unit 100 may determine whether traversal of all the rays has been completed. When the traversal of all the rays has been completed, a procedure may be terminated. When a ray for which traversal has not yet been completed is still present, operation 610 may be repeatedly performed.

The technical description set forth above with reference to FIGS. 1 through 5 may be applied as is and thus, a further detailed description will be omitted here.

Figure 7:
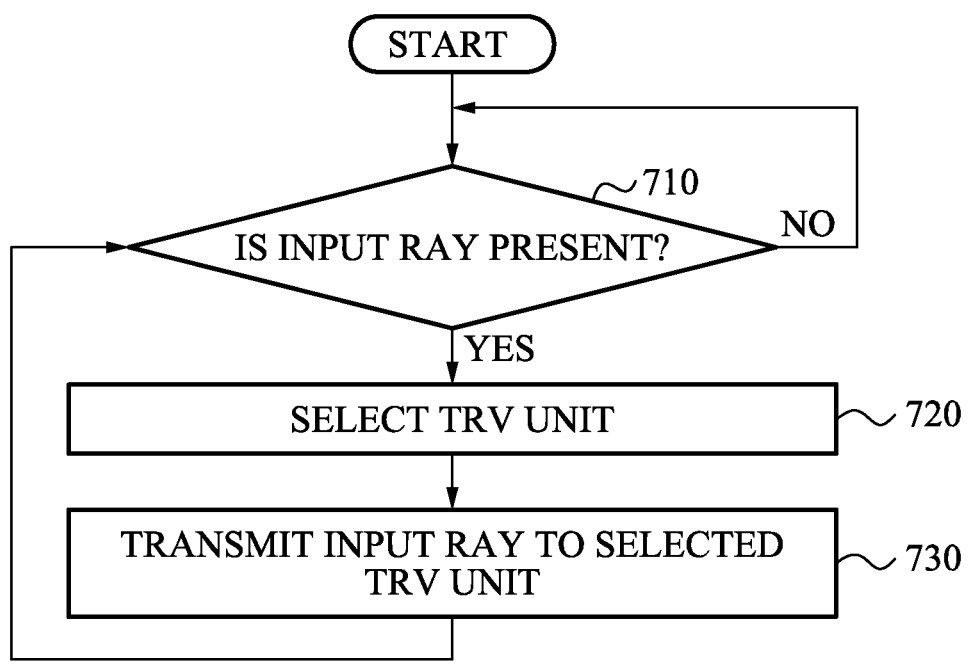
FIG. 7 illustrates an operation method of a ray dispatch unit according to an embodiment.

FIG. 7 illustrates an operation method of the ray dispatch unit 330 according to an embodiment.

The following operations 710 through 730 may correspond to operation 510 of FIG. 5 described above.

In operation 710, the ray dispatch unit 330 may determine whether a ray input from the ray generating unit 310 is present. When the input ray is absent, operation 710 may be repeatedly performed. On the contrary, when the input ray is present, operation 720 may be performed.

In operation 720, the ray dispatch unit 330 may select, from among a plurality of TRV units, a TRV unit to process a traversal of the input ray. The method described above with reference to FIG. 5 may be applied to operation 720.

In operation 730, the ray dispatch unit 330 may transmit the input ray to the selected TRV unit.

The technical description set forth above with reference to FIGS. 1 through 6 may be applied as is and thus, a further detailed description will be omitted here.

Figure 8:
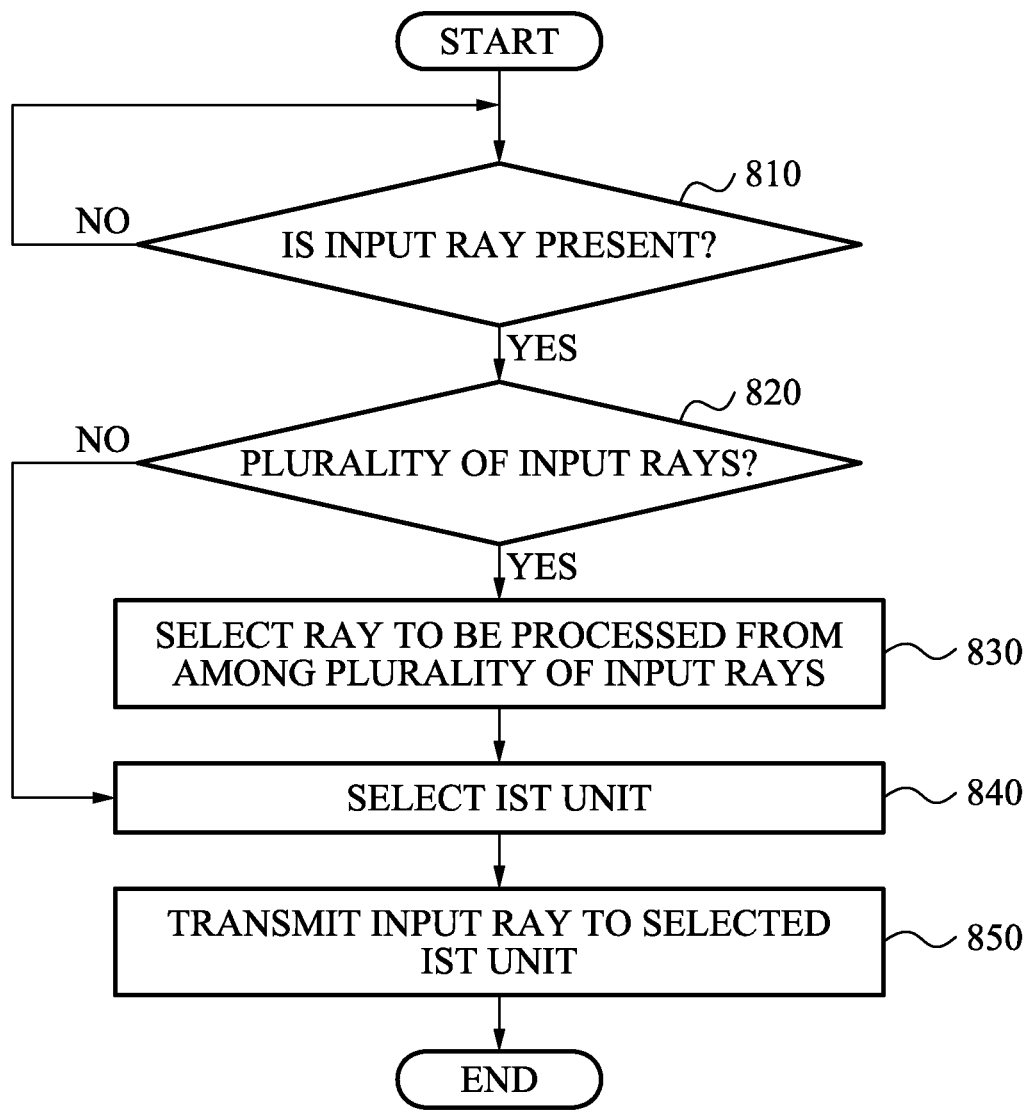
FIG. 8 illustrates an operation method of a ray arbitration unit according to an embodiment.

FIG. 8 illustrates an operation method of the ray arbitration unit 350 according to an embodiment.

The following operations 810 through 850 may correspond to operation 550 of FIG. 5 described above.

In operation 810, the ray arbitration unit 350 may determine whether a ray input from a plurality of TRV units is present. When the input ray is absent, operation 810 may be repeatedly performed. On the contrary, when the input ray is present, operation 820 may be performed.

In operation 820, the ray arbitration unit 350 may determine whether a plurality of rays has been input. When the plurality of rays has been input, operation 830 may be performed. On the contrary, when a plurality of rays has not been input, operation 840 may be performed.

In operation 830, the ray arbitration unit 350 may select, from among the plurality of input rays, a ray to be preferentially processed. Here, the method described above with reference to FIG. 5 may be applied to operation 830. The selected ray may be processed as the input ray in operation 850.

In operation 840, the ray arbitration unit 350 may select, from among a plurality of IST units, an IST unit to process an intersection test of the input ray. Here, the method described above with reference to FIG. 5 may be applied to operation 840.

In operation 850, the ray arbitration unit 350 may transmit the input ray to the selected IST unit.

The technical description set forth above with reference to FIGS. 1 through 7 may be applied as is and thus, a further detailed description will be omitted here.

According to the aforementioned methods, operation load balance between pipelines may be enhanced in ray tracing hardware that includes a plurality of TRV units and a plurality of IST units.

The ray processing method according to the above-described embodiments may be recorded in non-transitory computer-readable media including program instructions to implement various operations embodied by a computer or processor. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatuses described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A ray processing method, comprising:
   traversal processing of a ray, comprising at least one instance of
   selecting a traversal unit having a greatest age from among traversal units configured to process a traversal of the ray, wherein an age of each of the traversal units is determined based on ages of rays that are scheduled to be processed by each of the traversal units, respectively, and wherein an age of a respective ray, among the ages of the rays, is determined based on a number of traversals of the respective ray previously processed by the traversal units, and
   processing at least one traversal of the ray by using the selected traversal unit, the age of the ray being incremented after each processing of the traversal of the ray; and
   upon completion of the traversal processing of the ray, outputting a result indicative thereof, and deleting the ray and the age of the ray from the selected traversal unit, to decrease the age of the selected traversal unit.

2. The method of claim 1, wherein the age of a corresponding traversal unit, from among the traversal units, is a sum of the ages of the rays scheduled to be processed by the corresponding traversal unit.

3. The method of claim 1, wherein the age of a corresponding traversal unit, among the traversal units, is an average age of the rays scheduled to be processed by the corresponding traversal unit.

4. The method of claim 1, further comprising:
   selecting a ray having a greatest age among the rays;
   selecting, from intersection test units, an intersection test unit to process an intersection test of the selected ray; and
   processing the intersection test of the selected ray by using the selected intersection test unit.

5. A non-transitory computer-readable medium storing program instructions that, when executed by a processor, cause the processor to perform the method of claim 1.

6. A ray tracing apparatus, comprising:
   a processor configured to control one or more processor-executable units, wherein the processor-executable units comprise
   traversal units; and
   a ray dispatch unit configured to select a traversal unit having a greatest age among the traversal units, wherein an age of each of the traversal units is determined based on ages of rays that are scheduled to be processed by each of the traversal units, respectively, and an age of a respective ray, among the ages of the rays, is determined based on a number of traversals of the respective ray previously processed by the traversal units;
   wherein the selected traversal unit is configured to
   process at least one traversal of a ray, among the rays, increment the age of the ray after each processing of the traversal of the ray, and
   upon completion of traversal processing of the ray, output a result indicative thereof, and delete the ray and the age of the ray, to decrease the age of the selected traversal unit.

7. The ray tracing apparatus of claim 6, wherein the age of a corresponding traversal unit, among the traversal units, is a sum of the ages of the rays scheduled to be processed by the corresponding traversal unit.

8. The ray tracing apparatus of claim 6, wherein the age of a corresponding traversal unit, among the traversal units, is an average age of all of the rays scheduled to be processed by the corresponding traversal unit.

9. The ray tracing apparatus of claim 6, wherein the processor-executable units further comprise:
   intersection test units, each configured to process an intersection test of the rays; and
   a ray arbitration unit configured to select an intersection test unit, from the intersection test units,
   wherein the selected intersection test unit processes the intersection test of at least one of the rays.

10. A ray tracing apparatus, comprising:
    a processor configured to control one or more processor-executable units, wherein the processor-executable units comprise
    traversal units; and
    a ray dispatch unit configured to select a traversal unit having a greatest age among the traversal units, wherein an age of each of the traversal units is determined based on ages of rays that are scheduled to be processed by each of the traversal units, respectively, and wherein an age of a respective ray, among the ages of the rays, is determined based on a number of traversals of the respective ray previously processed by the traversal units, and upon completion of traversal processing of a ray among the rays, delete the age of the ray, to decrease the age of the selected traversal unit that processed the ray, wherein the selected traversal unit is configured to:

process at least one traversal of the ray, increment the age of the ray after each processing of the traversal of the ray, and upon completion of the traversal processing of the ray, output a result indicative thereof, and delete the ray therefrom.

11. The ray tracing apparatus of claim 10, wherein the age of a corresponding traversal unit, among the traversal units, is a sum of the ages of the rays scheduled to be processed by the corresponding traversal unit.

12. The ray tracing apparatus of claim 10, wherein the age of a corresponding traversal unit, among the traversal units, is an average age of all of the rays scheduled to be processed by the corresponding traversal unit.

13. The ray tracing apparatus of claim 10, wherein the processor-executable units further comprise:

intersection test units, each configured to process an intersection test of a ray the rays; and a ray arbitration unit configured to select an intersection test unit, from the intersection test units, wherein the selected intersection test unit processes the intersection test of at least one of the rays.

14. A ray tracing apparatus, comprising:

a processor configured to control one or more processor-executable units comprising traversal units, by performing a repeated processing of:

selecting a traversal unit having a greatest age among the traversal units, wherein an age of each of the traversal units is determined based on ages of rays that are scheduled to be processed by each of the traversal units, respectively, and wherein an age of a respective ray, among the ages of the rays, is determined based on a number of traversals of the respective ray previously processed by the traversal units, and upon completion of traversal processing of a ray among the rays, deleting the age of the ray, to decrease the age of the selected traversal unit that processed the ray, wherein for the selected traversal unit, the processor is further configured to control processing at least one traversal of the ray, incrementing the age of the ray after each processing of the traversal of the ray, and upon completion of the traversal processing of the ray, outputting a result indicative thereof, and deleting the ray from the selected traversal unit.

* * * * *